(12) United States Patent
Kusano

(10) Patent No.: US 7,680,435 B2
(45) Date of Patent: Mar. 16, 2010

(54) FLANGE, FLANGE PROCESSING DEVICE, AND METHOD OF PROCESSING FLANGE

(75) Inventor: Tetsuya Kusano, Susono (JP)

(73) Assignee: Ricoh Company, Ltd., Tokyo (JP)

( * ) Notice: Subject to any disclaimer, the term of this patent is extended or adjusted under 35 U.S.C. 154(b) by 316 days.

(21) Appl. No.: 11/627,175

(22) Filed: Jan. 25, 2007

(65) Prior Publication Data
US 2007/0172253 A1 Jul. 26, 2007

(30) Foreign Application Priority Data
Jan. 26, 2006 (JP) ............................. 2006-017395

(51) Int. Cl.
G03G 15/00 (2006.01)
(52) U.S. Cl. ..................................... 399/117
(58) Field of Classification Search ................. 399/117; 82/117
See application file for complete search history.

(56) References Cited

U.S. PATENT DOCUMENTS

| | | | |
|---|---|---|---|
| 5,771,425 A * | 6/1998 | Yamada et al. ............... 399/111 |
| 5,942,168 A * | 8/1999 | Ichikawa et al. ............ 264/40.1 |
| 6,089,811 A | 7/2000 | Watanabe et al. |
| 6,189,427 B1 * | 2/2001 | Kosho et al. ................... 82/122 |
| 6,608,983 B2 | 8/2003 | Terazawa et al. |
| 6,678,492 B1 | 1/2004 | Terazawa et al. |
| 6,701,112 B2 | 3/2004 | Kusano et al. |
| 6,907,214 B2 | 6/2005 | Kusano et al. |
| 6,983,840 B2 | 1/2006 | Yamazaki et al. |
| 7,039,346 B2 | 5/2006 | Terazawa et al. |
| 2002/0063399 A1 * | 5/2002 | Rohm ........................ 279/2.02 |
| 2004/0253023 A1 | 12/2004 | Terazawa et al. |
| 2005/0095033 A1 | 5/2005 | Kusano et al. |
| 2005/0129476 A1 * | 6/2005 | Kammermeier et al. ...... 409/132 |
| 2005/0208415 A1 * | 9/2005 | Tomoyori .................... 430/120 |
| 2005/0284778 A1 | 12/2005 | Yamazaki et al. |

FOREIGN PATENT DOCUMENTS

| | | |
|---|---|---|
| CN | 1069347 A | 2/1993 |
| DE | 196 40 599 A1 | 4/1998 |
| EP | 1 180 732 A2 | 2/2002 |
| JP | 7-13468 | 1/1995 |
| JP | 10-319782 | 12/1998 |
| JP | 11-242350 | 9/1999 |
| JP | 11242350 A * | 9/1999 |
| JP | 2003-233271 | 8/2003 |
| JP | 2003-241573 | 8/2003 |
| JP | 2003-255759 | 9/2003 |
| JP | 2004-184452 | 7/2004 |

* cited by examiner

Primary Examiner—David M Gray
Assistant Examiner—Billy J Lactaoen
(74) Attorney, Agent, or Firm—Oblon, Spivak, McClelland, Maier & Neustadt, L.L.P.

(57) ABSTRACT

To provide a flange to be attached to an end of a photoconductor drum, the flange including: a drum engagement part capable of being engaged with an inner surface of the photoconductor drum; and a center hole, wherein the flange is prepared by cutting at least one of a surface of the engagement part and an inner surface of the center hole so that the axis of the center hole coincides with the axis of the photoconductor drum.

13 Claims, 9 Drawing Sheets

Clamping part move

Air suction

Chipping

FIG. 10

Unit: μm

| Air pressure (Mpa) | | Coaxiality | Roundness |
|---|---|---|---|
| 0.00 | 1 | 3.2 | 1.6 |
| | 2 | 0.9 | 2.3 |
| | 3 | 2.9 | 1.9 |
| | 4 | 3.9 | 2.5 |
| | 5 | 2.7 | 3.2 |
| 0.15 | 1 | 3.5 | 2.7 |
| | 2 | 1.6 | 2.5 |
| | 3 | 2.4 | 1.2 |
| | 4 | 1.3 | 2.2 |
| | 5 | 0.8 | 1.3 |
| 0.20 | 1 | 1.2 | 2.1 |
| | 2 | 0.2 | 1.9 |
| | 3 | 1.5 | 1.9 |
| | 4 | 0.6 | 2.0 |
| | 5 | 1.3 | 1.9 |
| 0.25 | 1 | 0.5 | 2.2 |
| | 2 | 1.5 | 1.4 |
| | 3 | 2.5 | 1.8 |
| | 4 | 0.4 | 1.0 |
| | 5 | 2.4 | 1.7 |
| 0.30 | 1 | 2.9 | 1.8 |
| | 2 | 1.7 | 1.7 |
| | 3 | 1.8 | 1.7 |
| | 4 | 1.9 | 2.1 |
| | 5 | 1.5 | 1.5 |

Change in room temperature and outer diameter (μm) during cutting process

FLANGE, FLANGE PROCESSING DEVICE, AND METHOD OF PROCESSING FLANGE

BACKGROUND OF THE INVENTION

1. Field of the Invention

The present invention relates to a flange used for a base support (drum) of an electrophotographic photoconductor and, more particularly, to a flange made of synthetic resin, a flange processing device, and a method for processing a flange.

2. Description of the Related Art

In the electrophotographic photoconductor field for electrostatic image processing in electrostatic copiers, electrostatic printers, facsimiles, etc., a photoconductor drum is generally provided with a photosensitive layer at the uppermost surface and equipped with flanges in the openings formed at either ends of the photoconductor drum, and various types of units are arranged around it. While the photoconductor drum rotates, these units perform necessary or desired processes (e.g., selective exposure, development, image transfer, charge removal, and cleaning) on the photoconductor layer.

An electrophotographic photoconductor is fabricated by assembling together a cylindrical drum base support with a photosensitive layer that has been processed to a desired surface condition and centered flange members, i.e., the drum base support and flange members are separately manufactured and then assembled into a photoconductor.

As shown for instance in FIG. 14, a flange member 10 made of synthetic resin or the like includes a flange part (or drum bumping part) 2 and an insertion part (or drum engagement part) 1 to be inserted into the inside of a cylindrical photoconductor drum (base support) 20. The insertion part 1 protruding toward the movable side B is fitted to the inner side of the photoconductor drum 20 and serves to firmly fix the flange member 10 to the photoconductor drum 20, and the flange part 2 serves to fix the positional relationship between the photoconductor drum 20 and flange member 10 by being bumped into the edge of the photoconductor drum 10. The outer surface of the flange part 2 is provided with a helical gear 3 (hereinafter simply referred to as a "gear part" in some cases) that is engaged with a drive gear (not shown) for transmitting rotational power to the helical gear 3. In addition, a shaft hole 4 is formed at the axial center of the flange member 10 so that the flange member is rotatively supported from the fixed side A. P/L denotes a reference plane. FIG. 15 is a cross-section of an example of a gear-equipped flange member of different shape, cut along a plane passing through its central axis. This flange member 10 has a protruding helical gear 3 at the fixed side A of a thin flange part 2, which the helical gear 3 is smaller in diameter than the flange part 2. A concentric shaft hole 4 is formed penetrating through the insertion part (drum engagement part) 1, flange part 2, and helical gear 3.

In a case where a flange member to be pressed into a photoconductor drum is made of resin, in the prior art, the flange member is provided with an insertion part (drum engagement part) and an insertion stopping part (e.g., a flange part at which the flange member is bumped into the drum). The shape of the flange member needs to be so designed that the area of the flange member contacting the drum is large enough to avoid the situation where only the flange member rotates when force has been applied for rotating the photoconductor drum. Accordingly, the outer surface of the drum engagement part of the flange member, contacting the photoconductor drum, is designed to conform to the surface of the photoconductor drum.

Flanges of this type for photoconductor drum are disclosed for instance in Japanese Patent Application Laid-Open (JP-A) Nos. 07-13468 and 10-319782. Moreover, electrophotographic photoconductors formed using flanges are disclosed for instance in JP-A Nos. 2003-233271, 2003-241573, 2003-255759 and 2004-184452.

An image forming apparatus is generally equipped with a development device for supplying a toner-containing developer to the photoconductor drum, or a latent image bearing member, in order to visualize a latent image on the drum. Such development device systems are widely used wherein a development roller carries brush-shaped toner-containing developer particles on its surface, which are then allowed to contact a latent image on the photoconductor for visualizing the latent image.

Meanwhile, for example, in a case of a magnetic developer, a known configuration of a development roller that carries brush-shaped developer particles on its surface is that multiple magnets that serve as main magnetic poles and transfer magnetic poles are arranged in the development roller, whereby developer particles that have been transferred on the roller surface by means of the transfer magnetic poles are agglomerated into sets of particles stacked on top of each other on the roller surface by the main magnetic poles, making them in contact with the photoconductor surface.

Because the height of the stack of the particles attached to the development roller is influenced by magnetic attraction, the distance between the development roller and the photoconductor, i.e., the so-called development gap, needs to be specified for optimized conditions in which the developer is supplied to and is in contact with the photoconductor surface (see for example JP-A No. 2004-184452 for more details in this regard).

Support and rotation of the photoconductor drum are generally provided by a rotation spindle or bearings that are provided to flanges attached to both ends of the photoconductor drum, or by power supplied via gears. For this reason, these flanges need to be precisely and firmly fitted into openings at both ends of the photoconductor drum. For smooth and precise rotation of the photoconductor drum, the centers of the flanges need to be constantly held at the axis of rotation.

In order to obtain high-resolution images in an electrophotographic apparatus equipped with a photoconductor by optimizing the foregoing conditions by specifying the development distance, it is effective to manufacture a high-precision photoconductor. More specifically, it is necessary to reduce radial run-out of the photoconductor drum with respect to the flanges attached to both ends of the drum. To achieve this, it is necessary to use high-precision flanges.

However, attachment of flanges to a photoconductor is often conducted by press-fitting in combination with an additive where necessary, and thus the concentricity of the center holes of the flanges relative to the photoconductor drum surface is dependent on the manner in which they were press-fitted into the photoconductor. In this case, because of surface deviations of the press-fitted portions of the flange members from their center holes as well as of deformation of the flanges as a result of press-fitting, it has been difficult to improve concentricity of the flange center holes relative to the photoconductor drum surface.

Flanges formed by injection molding of plastic have been generally used as conventional flanges for photoconductor drum. However, there have been limitations with respect to precision in parameters of these flanges due to a variety of factors including dimensional precision of the mold used, deterioration of the mold, reproducibility of assembling the mold after disassembled for cleaning, lot-to-lot variations of resin, and molding variations. Specific characteristic values are concentricity and roundness. For continued mass production of flanges, however, there is a limitation in these values— it is required to admit a concentricity of 15 µm between the center shaft hole and drum engagement part of the flange and a roundness of 10 µm for both the shaft hole and drum engagement part. As described above, however, it is imperative to provide high-precision flanges for high-precision image formation. To achieve this, it is necessary that the molded article be subjected to a second cutting process to produce a high-precision component. Known technologies (methods and system) undesirably require a lot of skill and many steps for this.

Moreover, flanges for photoconductor drum are often equipped with a gear for transmitting driving force. In this case the mesh precision of the gear is an important characteristic value. Because of the structure of the mold, it has been difficult for flanges for photoconductor drum that are formed by injection molding to simultaneously exhibit high gear precision and high concentricity of the shaft hole relative to the drum engagement part diameter (see FIG. 15).

SUMMARY OF THE INVENTION

The present invention has been accomplished in order to overcome the foregoing problems, and an object of the present invention is to provide a flange with significantly improved run-out over its length that is used for a photoconductor drum, as compared to those prepared by injection molding through a conventional mold. Another object of the present invention is to provide a flange processing device and a method for processing a flange, each of which is capable of providing flanges of the same quality by making both the concentricity and roundness 0.005 mm or less. The final object of the present invention is to enable image forming apparatus to produce high-quality images.

The present invention aims to significantly increase dimensional precision of a synthetic resin flange by cutting two important portions thereof through a cutting process, which such a high dimensional precision has not been achieved only by injection molding. The flange of the present invention to be attached to a photoconductor drum includes a drum engagement part capable of being engaged with an inner surface of the photoconductor drum; and a center hole, wherein the flange is prepared by cutting at least one of a surface of the drum engagement part and an inner surface of the center hole so that the axis of the center hole coincides with the axis of the photoconductor drum. Cutting of this flange is performed without entailing re-clamping of the flange to a lathe chuck, and thereby the drum engagement part and the center hole are cut in such a way that the concentricity between the drum engagement part and the center hole is 0.005 mm or less and that the roundness of the drum engagement part is 0.005 mm or less, thereby reducing variations in the development gap and providing high-quality images.

It is preferable to form a narrow groove near the drum bumping part (flange part) so that the outer diameter of the drum engagement part (engagement diameter) is 0.1-0.5 mm smaller at the groove than at other areas of the drum engagement part. To prevent burrs on the flange from being pinched between the flange and the drum, the groove is provided near the drum bumping part so that the burrs are placed into the groove, thereby the stabilizing engagement condition. This groove or step cannot be formed with high precision only by means of injection molding, but can be formed by cutting process. The groove provided near the drum bumping part allows the flange to be attached to a photoconductor drum without any pinching of burrs at the drum end.

Moreover, the flange may be provided with a protruding part at a position opposite to the drum engagement part, which the protruding part is to be clamped to a lathe chuck upon cutting of the drum engagement part and center hole. This protruding part is provided to a flange with no gears that allows clamping of the flange to a lathe chuck. Since this flange is provided with the protruding part at its end surface, it can be clamped to the chuck even without gears. Thus cutting of the drum engagement part and center hole is made possible without re-clamping of the flange clamped to the chuck.

The flange processing device of the present invention includes: stocking means capable of housing a plurality of flanges therein; cutting means for cutting the flanges; and supplying means for supplying the flanges housed in the stocking means to the cutting means. Thereby, the flanges are transferred to the cutting means automatically and thus the injection molding step can be efficiently connected to the cutting step.

A cooling unit may be provided for blowing cooled air to the stocking means. This cooling unit for blowing cooled air to the flanges to be transferred to the cutting means can facilitate shape stabilization and thereby the flanges can be subject to cutting step in a time efficient manner.

The flange processing device of the present invention is one in which a thread-like chipping is removed by air suction from the inside of the lathe chuck at the main spindle. With this configuration, it is possible to remove chipping generated as a result of cutting of center hole and to prevent the chipping from being entwined with the bite.

The method of the present invention for processing a flange is one for processing a flange which include a drum engagement part capable of being engaged with an inner surface of a photoconductor drum and a center hole and which is to be attached to an end of the photoconductor drum, wherein in a state where a flange provided with a gear part is clamped to a lathe chuck at the gear part, at least one of a surface of the drum engagement part and an inner surface of the center hole is cut. By cutting the drum engagement part (shaft hole) and center hole in a state where the gear part is clamped to the lathe chuck, it is possible to reduce the pitch error over total teeth (i.e., it is possible to improve gear precision). Upon cutting of a flange provided with a protruding part, cutting of the drum engagement part and center hole is performed with the protruding part being clamped to the lathe chuck. In this way the drum engagement part and center hole can be cut with high precision. In the foregoing flange processing method, it is preferable to adopt an air balloon chuck in order to clamp a flange to the lathe chuck with a low pressure. Alternatively, a diaphragm chuck may be used in order to clamp a flange with a low pressure just as the air balloon chuck can. In this case, similar effects can be obtained. More specifically, the use of such a diaphragm chuck enables flange clamping at a pressure low enough to avoid deformation of the flange. Furthermore, the number of jaws provided to the lathe chuck is preferably 6 to 8. This prevents flange deformation to a greater extent.

It is preferable during cutting process to remove a thread-like is chipping by air suction from the inside of the lathe chuck. In addition, it is preferable that the bite enter the flange at an angle of 3° to 45° for the cutting of the center hole. By doing so it is possible to prevent generation of burrs at the initial stage of cutting. It is also preferable that the bite withdraw out of the flange at an angle of 3° to 45° for the cutting of the center hole. By doing so it is possible to prevent generation of burrs at the final stage of cutting. Furthermore, it is preferable to set cutting depth to 0.05-3 mm. This allows chippings to be linked together into a thread-like chipping which can be readily removed.

In the flange processing method, during the cutting process, a feedback control is established in which the work temperature is measured and cutting depth is changed according to the linear expansion coefficient of resin used. By this feedback control mechanism, the processed flanges have the same dimension even when room temperature and the flange surface temperature varied during the cutting process.

According to the present invention, it is possible to manufacture a high-precision flange for photoconductor drum without fail, and to provide a high-quality photoconductor drum attached to a flange that has significantly improved run-out over its length as compared to those prepared by injection molding through a conventional mold.

BRIEF DESCRIPTION OF THE DRAWINGS

FIG. 10 shows data obtained after cutting process.

DESCRIPTION OF THE PREFERRED EMBODIMENTS

Figure 1:
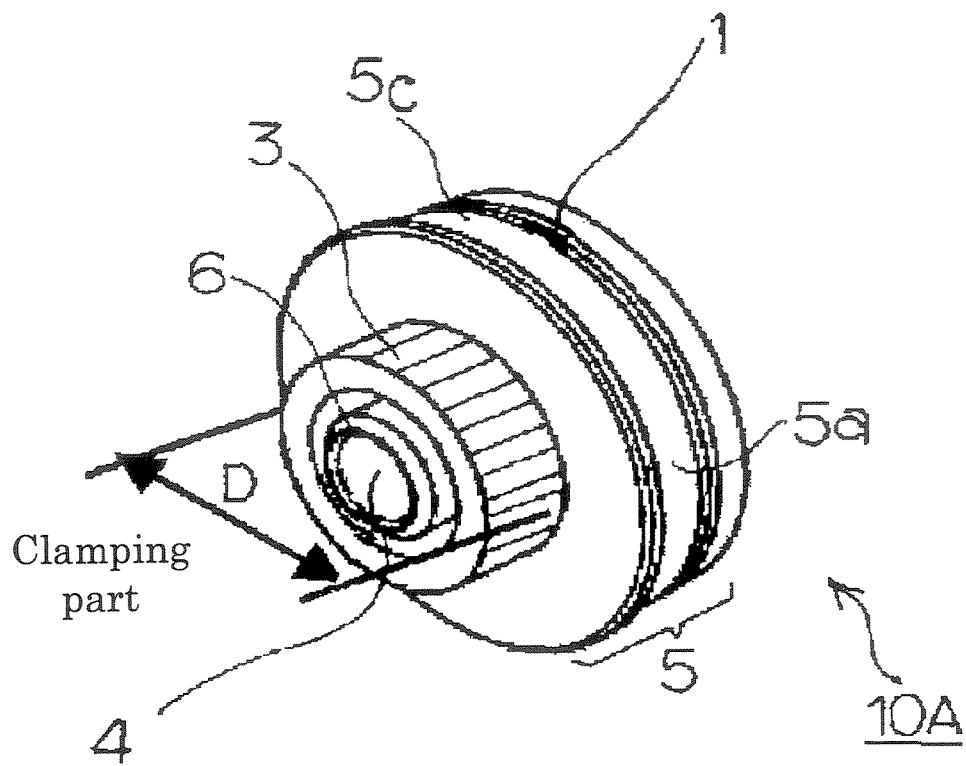
FIG. 1 shows a schematic perspective view showing an appearance of a flange of the present invention prior to cutting process.
Figure 2:
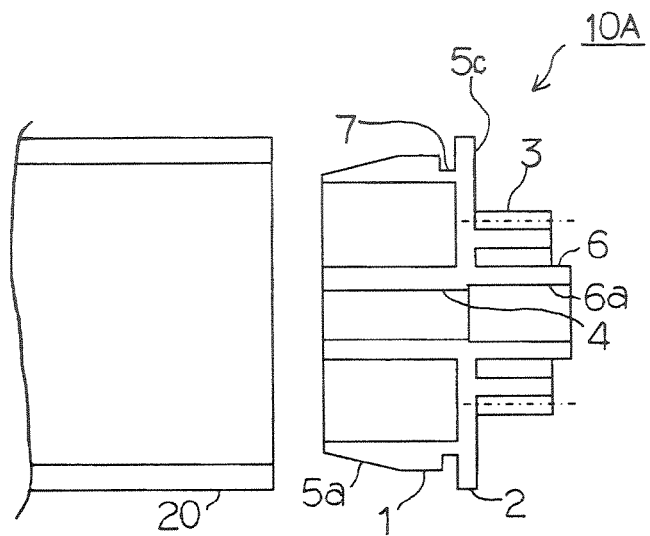
FIG. 2 is an enlarged cross-sectional view of the flange of FIG. 1 after cutting process, which is provided with a groove at the bottom of the drum bumping part thereof.
Figure 3:
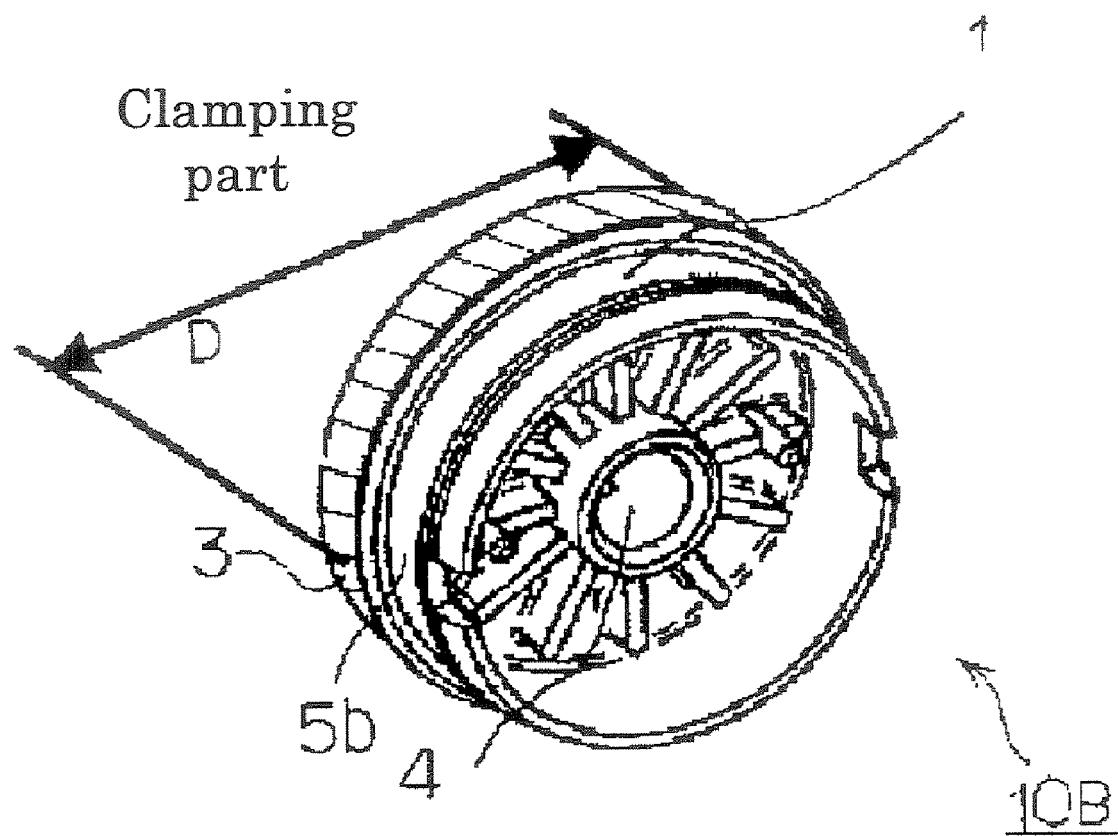
FIG. 3 is a schematic perspective view showing an appearance of another flange of the present invention prior to cutting process.
Figure 4:
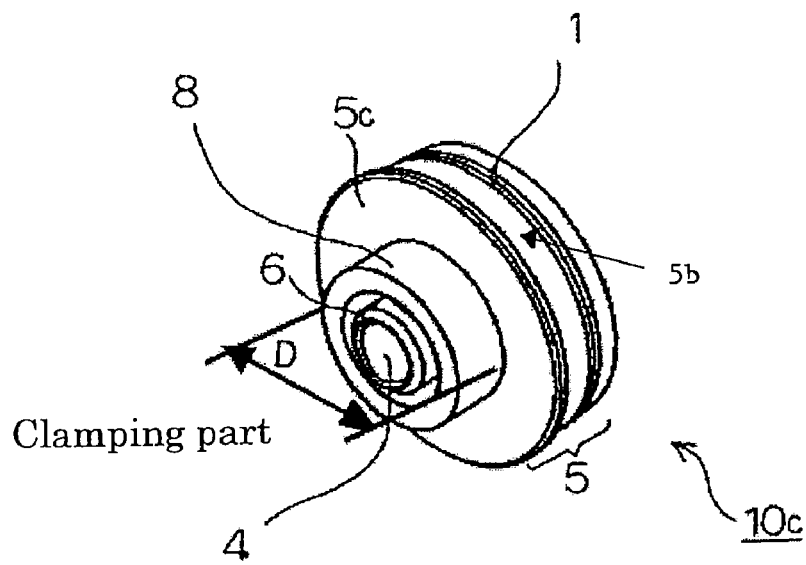
FIG. 4 is a schematic perspective view showing an example of the shape (prior to cutting process) of a gear-free flange of the present invention, which is provided with a protruding part.
Figure 5:
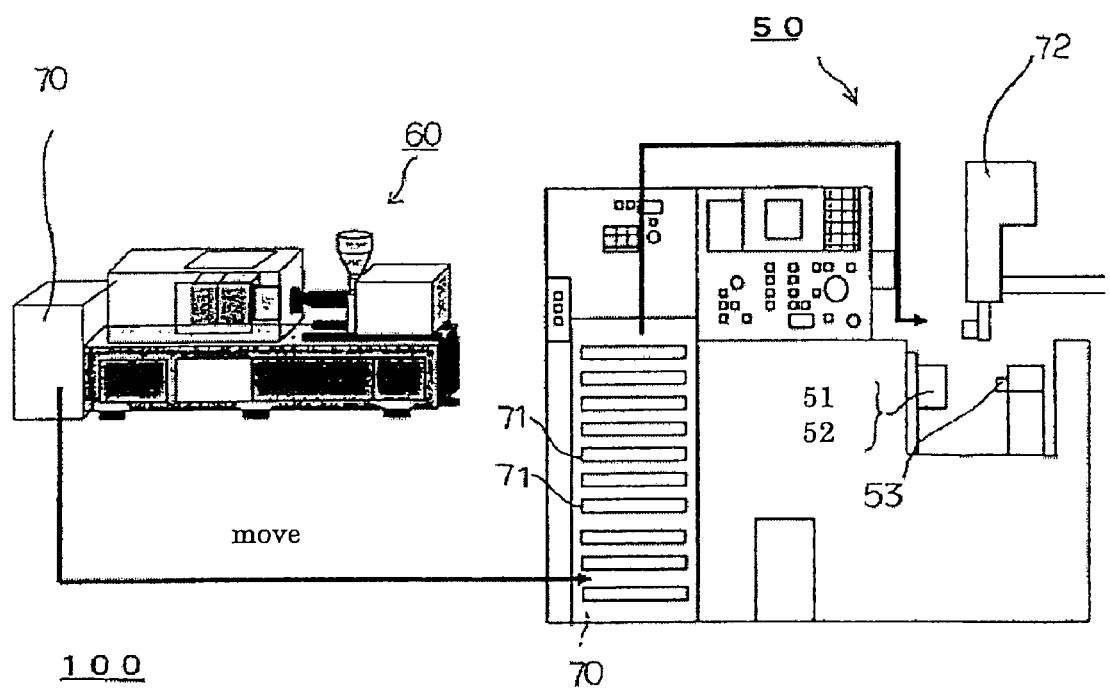
FIG. 5 is a perspective view showing a system configuration of a flange processing device (system) according to the present invention.

Hereinafter an embodiment of the present invention will be described with reference to the drawings. FIG. 1 shows a schematic perspective view showing an appearance of a flange (member) 10A of the present invention prior to cutting process. FIG. 2 is an enlarged cross-sectional view of the flange 10A of FIG. 1 after cutting process, which is provided with a groove 7 at the bottom of the drum bumping part 2 thereof. FIG. 3 is a schematic perspective view showing an appearance of another flange 10B of the present invention prior to cutting process. FIG. 4 is a schematic perspective view showing an example of the shape (prior to cutting process) of a gear-free flange 10C of the present invention, which is provided with a protruding part 5b. FIG. 5 is a perspective view showing a system configuration of a flange processing device (system) according to the present invention.

A flange 10A shown in FIG. 1 is a two-staged substantially cylindrical member formed by injection molding of synthetic resin. The flange 10A is cut on a lathe or the like to give a shape shown in FIG. 2. One end surface 5a of a large diameter-main cylinder 5 includes a protruding part 5b that after cutting serves as a drum engagement part 1 to be fitted into the inner circumference of a photoconductor drum end (not shown). At the center of the other end surface 5c of the main cylinder 5, having a circular end, has a protruding helical gear 3 and protruding shaft cylinder 6 to be a shaft portion, both of which are smaller in diameter than the main cylinder 5. The center hole 6a in the shaft cylinder 6 communicates with the shaft hole 4. As shown in FIG. 2, the drum engagement part 1 is cut to have a predetermined outer diameter in such a way that it is coaxial with the helical gear 3. As shown in the cross-sectional view of FIG. 2, a narrow groove 7 is formed in the vicinity of the drum bumping part (flange part) 2 of the flange 10A so that the diameter of the drum engagement part 1 (engagement diameter) is 0.1-0.5 mm smaller at the groove 7 than at other areas of the drum engagement part 1. The center hole part 6a of the cylindrical shaft portion 6 provided at the center of the flange is processed to form a shaft hole 4 that is coaxial with the drum engagement part 1 and helical gear 3.

A flange 10B shown in FIG. 3 is also a substantially cylindrical member formed by injection molding of synthetic resin. The flange 10B is cut on a lathe or the like to form a protruding part 5b at one end surface 5a of the main cylinder 5, which the protruding part 5b becomes a drum engagement part 1 to be fitted into the inner circumference of a photoconductor drum end. In the flange 10B shown in FIG. 3, the other end surface of the main cylinder 5 is processed to be a helical gear 3. In a subsequent process, the drum engagement part 1 is cut so as to be coaxial with the helical gear 3. A narrow groove (step) 7 is formed in the vicinity of the drum bumping part (flange part including the helical gear 3) 2 of the flange 10B so that the diameter of the drum engagement part 1 (engagement diameter) is 0.1-0.5 mm smaller at the groove 7 than at other areas of the drum engagement part 1. The center hole part at the center of the flange is processed to form a shaft hole 4 that is coaxial with the drum engagement part 1 and helical gear 3.

A flange 10C of the present invention shown in FIG. 4 (prior to cutting process) is a flange that does not have a gear, and is a member formed by injection molding of synthetic resin as are the foregoing flanges 10A and 10B. The flange 10C is cut on a lathe or the like to form a protruding part 5b at one end surface 5a of the main cylinder 5, which the protruding part 5b becomes a drum engagement part 1 to be fitted into the inner circumference of a photoconductor drum end. At the center of the other end surface 5c of the main cylinder 5, there is provided a protruding protruding part 8 (for chucking) that is smaller in diameter than the main cylinder 5, forming a two-staged substantially cylindrical member. At the inner side of the protruding part 8, a protruding shaft cylinder 6 is formed that becomes a shaft portion. The center hole part of the cylindrical shaft portion 6 provided at the center of the flange is processed to form a shaft hole 4 that is coaxial with the drum engagement part 1 and helical gear 3. The drum engagement part 1 is cut to have a predetermined outer diameter and, as in the case of FIG. 2, in the vicinity of the drum bumping part (flange part) 2 thereof, there is provided a narrow groove 7 so that the diameter of the drum engagement part 1 (engagement diameter) is 0.1-0.5 mm smaller at the groove 7 than at other areas of the drum engagement part 1.

Because of their specific structures these flanges 10A, 10B and 10C can achieve the concentricity of 0.005 mm or less and roundness of 0.005 mm or less much easier than conventional flanges. This is achieved by setting the inner and outer diameters of the drum engagement part and center hole to predetermined values through a cutting process in which the flange is clamped to the lathe chuck only once (i.e., without re-clamping the flange to the chuck).

In particular, the use of a processing device to be described later and a cutting process in accordance with a processing method to be described later can, without fail, ensure that both the concentricity and roundness are 0.005 mm or less without re-clamping of the flange to be processed.

A flange processing device (system) shown in FIG. 5, which is suitable for cutting of the flanges, will be described below. The flange processing device 100 shown in FIG. 5 is composed primarily of a lathe 50, a cutting machine to be described later in detail. A stacker 70 can be attached to the flange processing device 100 for increasing overall operational efficiency in conjunction with an injection molding machine 60. To be more specific, a stacker 70 for transferring flanges is attached to the flange processing device 100 so that flanges formed by injection molding can be readily supplied to the cutting machine. The stacker 70 is provided with trays 71 for storing flanges prepared using the injection molding machine 60, and is connected to the side of the lathe 50 (hereinafter may be referred to as a "cutting machine"). In this way flanges can be automatically supplied from the tray 71 to the chuck 51 of the cutting machine 50 by means of a (flange member) supplier 72.

Figure 7:
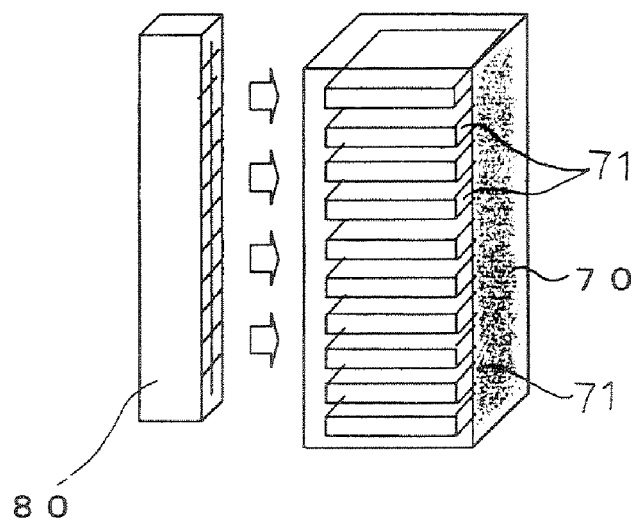
FIG. 7 is a schematic view showing an example of a device for uniformly blowing cooled air to a stacker.

An air blower 80 is incorporated into the flange processing system 100 so that the stacker 70 can function effectively. Injection molded flanges exhibit shrinkage right after their preparation and thus generally need to be left stand for a long period of time before their shapes are stabilized. However, it is necessary that full shrinkage be accomplished in the shortest time for synchronized operation with the cutting machine. To stabilize the shapes of flanges stored in the stacker 70 as early as possible, the air blower 80 (see FIG. 7) is incorporated into the flange processing system 100 as a cooling device for blowing cooled air to the flanges in the stacker 70.

As described above, it succeeded in stabilizing the flange shapes by facilitating their shrinkage by using such an air blower. For increased heat efficiency, a stainless steel shield is wrapped around the stacker 70. This cooling method can facilitate cooling of flanges at low costs, however, for a shorter flange shape stabilization time, another method may be adopted wherein a refrigerator is used that can accommodate the entire stacker.

The lathe 50 uses a 6-jaw diaphragm chuck as the chuck 51 that can be attached to the rotational spindle. This is because there is a concern of causing deformation of the flange due to the strain of clamping force when it is clamped to the chuck by means of normal air or oil pressure upon cutting of portions near the chuck. The use of the diaphragm chuck 51 enables flange clamping at a pressure low enough to avoid deformation of the flange. By controlling the pressure applied to the diaphragm chuck 51, it is possible to achieve delicate cutting condition changes in a case where the shape of a non-processed injection molded article has changed from the previous one. Note that a similar effect can be obtained even when an air balloon chuck is used as the chuck for the lathe 50.

The lathe 50 has a function of removing a thread-like chipping (cutting) by air suction at the spindle 52. To be more specific, for the purpose of removing chippings during the cutting process, the lathe 50 has a hollow at the spindle through which a suction device (not shown) is connected to the lathe 50 for suctioning chippings by air from inside the spindle 52. To realize this configuration it is necessary to ensure that cutting depth falls within a proper range (0.05-0.3 mm) during the actual cutting process so that chippings can be readily removed in the form of a thread-like chipping rather than separate chipping pieces. Note that the chipping suction configuration is not particularly limited to the above-noted configuration.

An example of a cutting operation will be described specifically below. A gear-equipped flange which is formed by injection molding of resin and has a shape shown in FIG. 1 is attached to the lathe by clamping it to the 6-jaw chuck at the outer surface of the gear part provided at the end of the flange.

Cutting is performed first for the drum engagement part of the flange. Although a proper cutting depth to form a thread-like chipping differs depending on the material, a cutting depth is preferably about 0.15 mm in the case of general polycarbonate. A groove is provided at the drum bumping part of the flange (see FIG. 2). The groove is about 0.1-05 mm in depth and the depth can be appropriately set according to the finish of the drum end. It was confirmed that a groove of 0.2 mm depth can avoid influences of burrs and warpage at the drum end.

Figure 6:
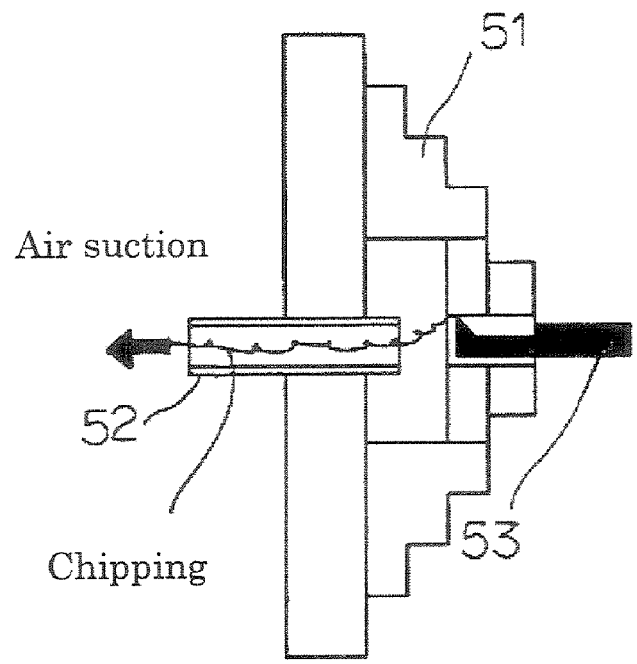
FIG. 6 is a schematic view showing a configuration for removing a thread-like chipping by air suction at the spindle of the lathe.
Figure 8:
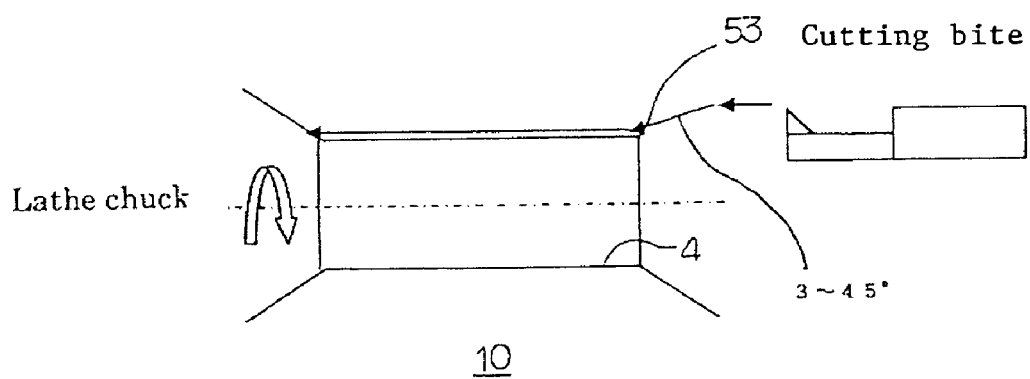
FIG. 8 is a schematic diagram for explaining a pattern in which the bite moves upon cutting of the center shaft hole.
Figure 9:
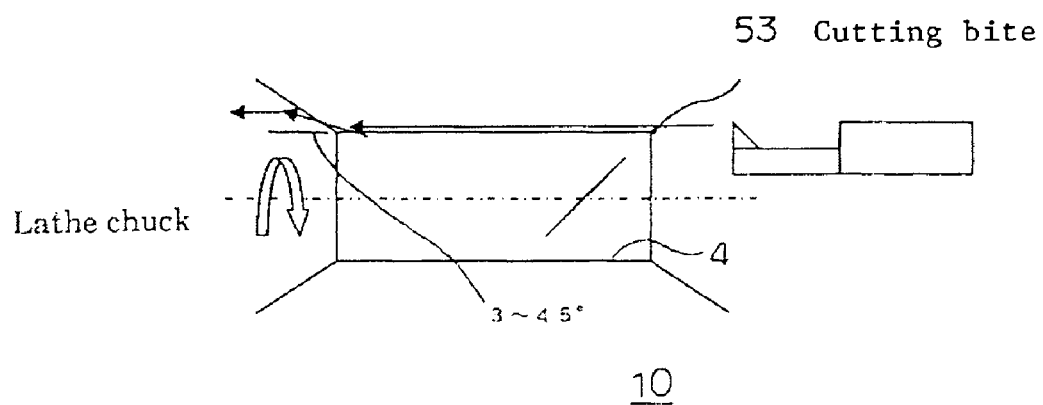
FIG. 9 is another schematic diagram for explaining a pattern in which the bite moves upon cutting of the center shaft hole.

With the configuration shown in FIG. 6, a thread-like chipping is removed by air suction at the spindle of the lathe upon cutting of a shaft hole. For forming a thread-like chipping, the cutting depth is set to about 0.15 mm in the case where the flange is made of polycarbonate. An optimal cutting depth is selected depending on the material. During the cutting of a shaft hole, a thread-like chipping is removed together with other chipping pieces by air suction without any tangle of the thread-like chipping. To avoid generation of burrs at the end of the resultant shaft hole of the flange, which are created as a result of entry of the bite 53 (cutting tool) into the flange shaft core, it is preferable to change the angle at which the bite 53 enters the flange. FIG. 8 shows a pattern in which the bite 53 moves upon cutting of the shaft hole. With this cutting method, it is possible to avoid generation of burrs during entry of the bite 53. Furthermore, in order to avoid generation of burrs that are generated by withdrawal of the bite 53, it is preferable to change the angle in which the bite 53 withdraws out of the flange. FIG. 9 shows a pattern in which the bite 53 withdraws out of the flange during cutting the shaft hole. With this cutting method, it is possible to avoid generation of burrs during withdrawal of the bite 53. For example, a cutting process adopting a bite entry angle of 30° and a bite withdrawal angle of 35° gave good results.

Figure 11:
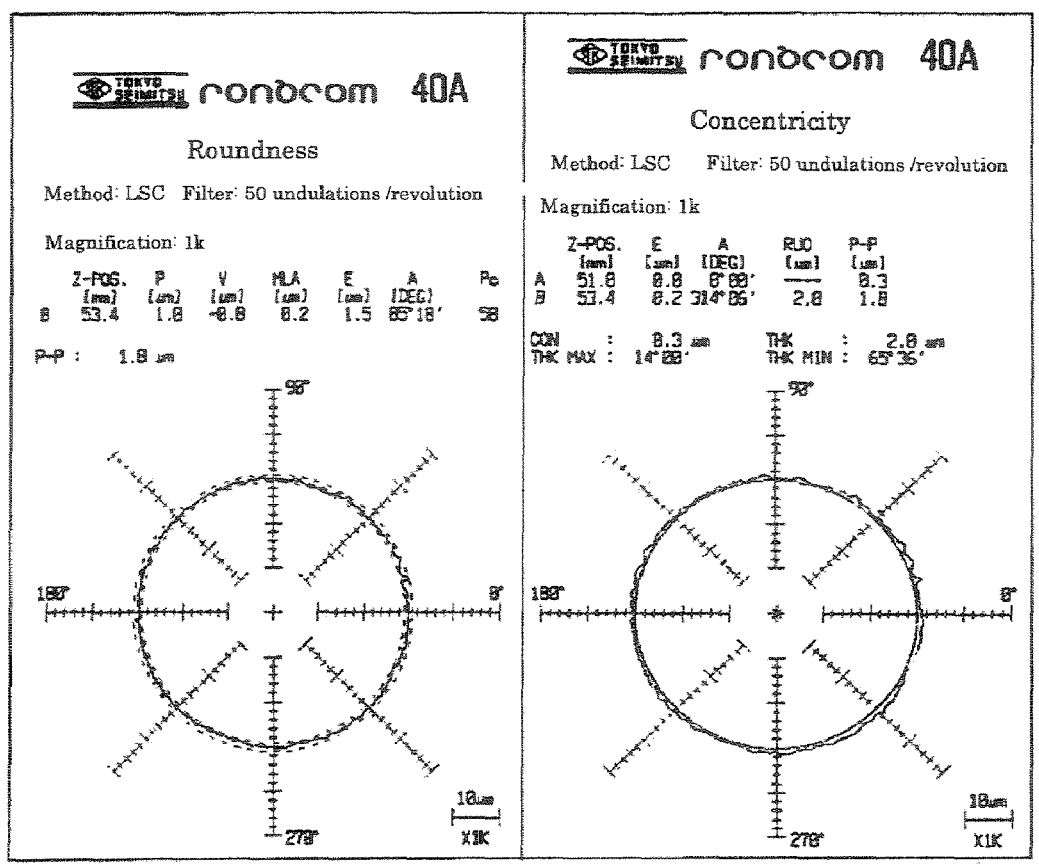
FIG. 11 shows concentricity and roundness values for an article processed by a processing device according to an embodiment of the present invention, which are measured by a roundness analyzer made by TOKYO SEIMITSU.

By cutting the drum engagement part and shaft hole part while clamping the outer surface of the gear part of the flange to the chuck, it succeeded in obtaining low concentricity between the resultant shaft hole and drum engagement part and excellent roundness. FIG. 11 shows obtained concentricity and roundness values measured by a roundness analyzer made by TOKYO SEIMITSU.

Figure 12:
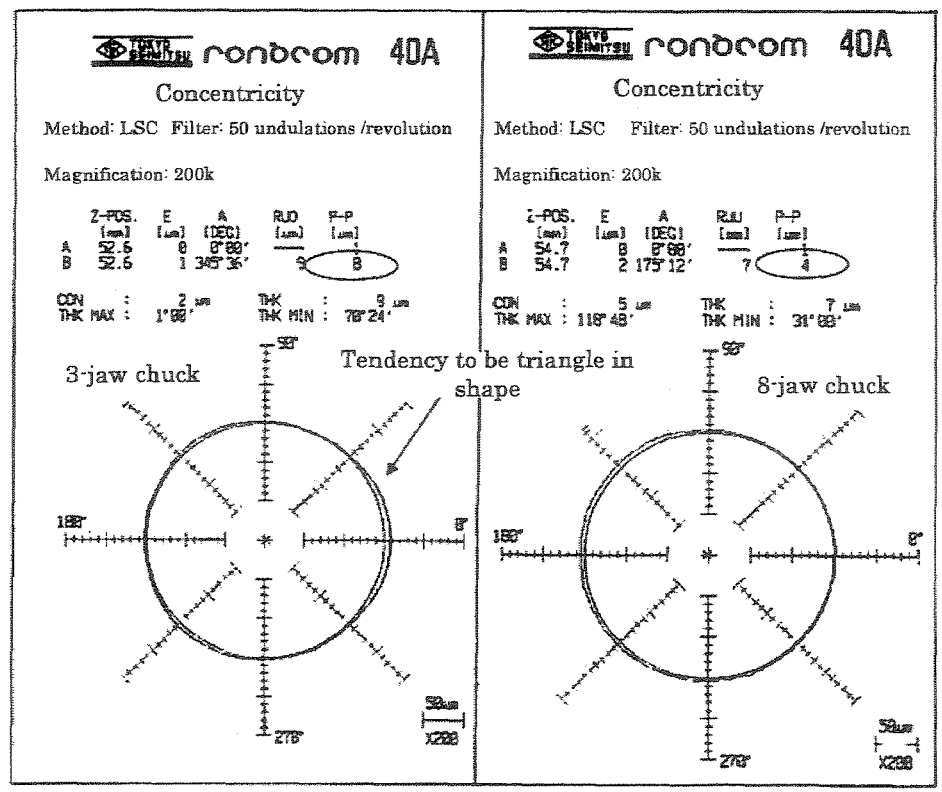
FIG. 12 shows processing results obtained using diaphragm chucks other than a 6-jaw diaphragm chuck.

A 6-jaw diaphragm chuck was adopted, and it succeeded in achieving precisions shown in FIG. 11 in mass production of flanges with this chuck. However, the number of jaws may be 6 or more. Pre-evaluations were made with respect to a 3-jaw diaphragm chuck and an 8-jaw diaphragm chuck, and evaluation results are shown in FIG. 12. In the case of the 3-jaw diaphragm chuck, there was a tendency that the cross-sectional shape of the processed flange. In order to ensure excellent cutting results, it is preferable that the number of jaws is 6 or more.

FIG. 10 shows cutting process data with different pressures (0-0.6 Mpa) applied to the diaphragm chuck. Pressure control can realize delicate cutting condition changes in a case where the shape of a non-processed injection molded article has changed from the previous one.

An air balloon chuck may be used as a chuck for clamping a flange to the lathe chuck, in order to clamp the flange with a low pressure as in the case of a diaphragm chuck. The air balloon chuck can provide the same effect as the diaphragm chuck.

Figure 13:
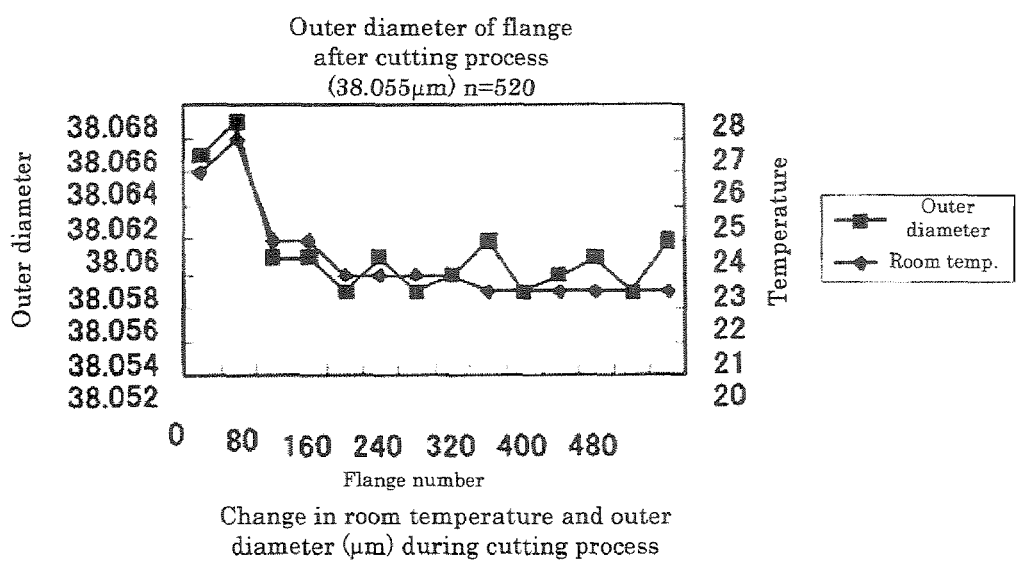
FIG. 13 shows variations in outer diameter of flange when room temperature varied from 22° C. to 27° C.
Figure 14:
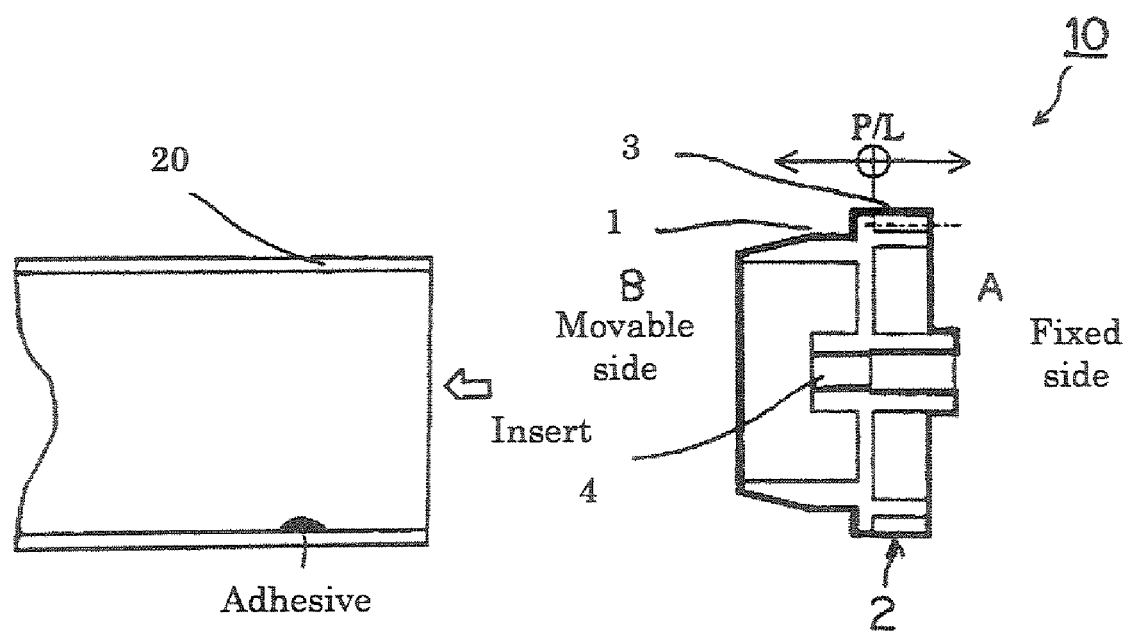
FIG. 14 is a cross-sectional view of an example of a gear-attached flange, including its center axis.
Figure 15:
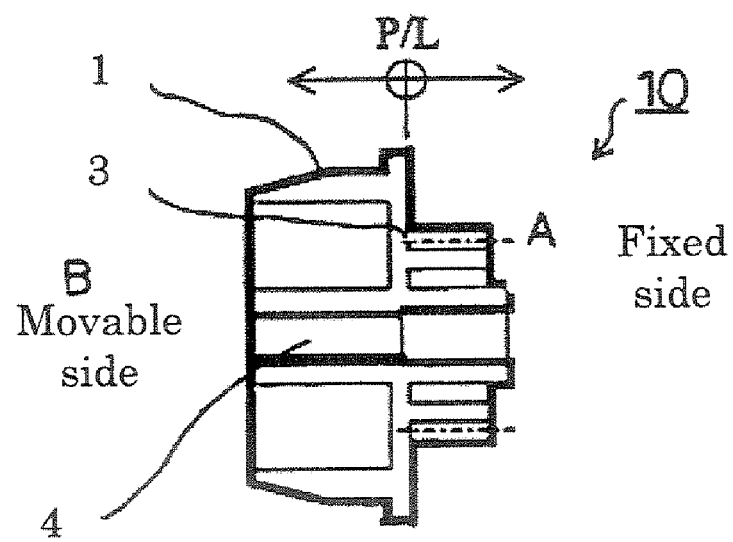
FIG. 15 is a cross-sectional view of another example of a gear-attached flange, including its center axis.

Flange temperature changes during the actual cutting process causes flange expansion or shrinkage, and hence the cutting amount changes. FIG. 13 shows variations in outer diameter of flange when room temperature varied from 22° C. to 27° C. As shown in FIG. 13, since the outer diameter of flange changes with the temperature, the processing device according to the embodiment is so configured that the variations in dimension among identical flanges can be minimized by controlling the degree of entry of the bite in the flange by feedback control according to the temperature change. For reference temperature data for this feedback control, either work surface temperature or room temperature is selected depending on the circumstances. Note, however, that if the room temperature change can be within about ±2° C. during the course of the cutting process, the effect of this feedback control is little and, since the cutting depth is preferably constant, in actual, room temperature-based control may be selected.

Although the descriptions given above are directed to the cutting process for the flange shown in FIG. 1, the flange shown in FIG. 3 can be processed with high precision in much the same way by clamping the outer surface of the gear part of the protruding part of the flange. The flange shown in FIG. 4 formed by injection molding of resin is attached to the lathe 50 by clamping the protruding part 8, which is provided to its end, to the 6-jaw chuck 51. High-precision cutting of the drum engagement part 1 and center hole (shaft hole) 4 is made possible by performing cutting with the protruding part 8 being clamped to the lathe chuck only for once.

The present invention can be widely applied to substantially cylindrical mechanical components such as rollers that include plastic flanges attached at either end thereof, whereby roundness and concentricity are improved to increase rotation performance of the components.

What is claimed is:

1. A flange to be attached to an end of a photoconductor drum, the flange comprising:
    a drum engagement part configured to be engaged with an inner surface of the photoconductor drum;
    a center hole; and
    a flange part which is larger in outer diameter than the drum engagement part,
    wherein a groove is formed in the drum engagement part at a position near the flange part, and a diameter of the drum engagement part is 0.1 mm to 0.5 mm smaller at the groove than at an adjacent area of the drum engagement part in a direction away from the flange part, and
    wherein the flange is prepared by the process comprising:
        cutting a surface of the drum engagement part and an inner surface of the center hole so that an axis of the center hole coincides with an axis of the photoconductor drum.

2. The flange according to claim 1, further comprising:
    a protruding part whose maximum outer diameter is smaller than an outer diameter of the drum engagement part.

3. The flange according to claim 2, wherein the cutting is performed with the protruding part being clamped to a lathe chuck.

4. The flange according to claim 1, wherein the flange is attached to the photoconductor drum so that the drum engagement part is housed inside the photoconductor drum.

5. A method for processing a flange which includes a drum engagement part configured to be engaged with an inner surface of a photoconductor drum and a center hole and which is to be attached to an end of the photoconductor drum, the method comprising:
    cutting a surface of the drum engagement part and an inner surface of the center hole so that an axis of the center hole coincides with an axis of the photoconductor drum in a state where the flange is engaged with the inner surface of the photoconductor drum; and
    providing a groove in the drum engagement part at a position near a flange part of the flange,
    wherein a diameter of the drum engagement part is 0.1 mm to 0.5 mm smaller at the groove than at an adjacent area of the drum engagement part in a direction away from the flange part.

6. The method for processing a flange according to claim 5, wherein the flange further comprises a protruding part, and the cutting is performed with the protruding part being clamped to a lathe chuck.

7. The method for processing a flange according to claim 6, wherein an air balloon chuck is used as the lathe chuck for clamping the flange.

8. The method for processing a flange according to claim 6, wherein a diaphragm chuck is used as the lathe chuck for clamping the flange.

9. The method for processing a flange according to claim 8, wherein a number of jaws provided to the chuck is 6 to 8.

10. The flange according to claim 1, wherein the process further comprises clamping the flange to a lathe chuck only once such that the cutting produces the drum engagement part from a protruding part and the cutting produces the center hole while the flange is clamped to the lathe chuck.

11. The method for processing a flange according to claim 5, further comprising:
    clamping the flange to a lathe chuck only once such that the cutting produces the drum engagement part from a protruding part and the cutting produces the center hole while the flange is clamped to the lathe chuck.

12. A photoconductor drum, comprising:
    a drum;
    a flange attached to an end of the drum, the flange comprising a drum engagement part configured to be engaged with an inner surface of the drum, and a center hole; and
    a flange part which is larger in outer diameter than the drum engagement part,
    wherein a groove is formed in the drum engagement part at a position near the flange part, and a diameter of the drum engagement part is 0.1 mm to 0.5 mm smaller at the groove than at an adjacent area of the drum engagement part in a direction away from the flange part, and
    wherein the flange is prepared by the process comprising:

cutting a surface of the drum engagement part and an inner surface of the center hole so that an axis of the center hole coincides with an axis of the photoconductor drum.

13. The photoconductor drum according to claim 12, wherein the process further comprises clamping the flange to a lathe chuck only once such that the cutting produces the drum engagement part from a protruding part and the cutting produces the center hole while the flange is clamped to the lathe chuck.

* * * * *